(12) United States Patent
Watten

(10) Patent No.: US 10,800,497 B2
(45) Date of Patent: Oct. 13, 2020

(54) HYDROXIDE STABILIZATION AS A MEANS OF CONTROLLING SURFACE FOULING ASSOCIATED WITH WETTED SURFACES OF BOATS BARGES AND SHIPS

(71) Applicant: The USA, as represented by the DOI, Washington, DC (US)

(72) Inventor: Barnaby Jude Watten, Winchester, WV (US)

(73) Assignee: U.S. Geological Survey, Reston, VA (US)

( * ) Notice: Subject to any disclaimer, the term of this patent is extended or adjusted under 35 U.S.C. 154(b) by 125 days.

(21) Appl. No.: 16/145,906

(22) Filed: Sep. 28, 2018

(65) Prior Publication Data
US 2019/0185117 A1 Jun. 20, 2019

Related U.S. Application Data

(60) Provisional application No. 62/599,987, filed on Dec. 18, 2017.

(51) Int. Cl.
*E02C 1/00* (2006.01)
*B63B 59/04* (2006.01)
(Continued)

(52) U.S. Cl.
CPC .............. *B63B 59/04* (2013.01); *B08B 3/08* (2013.01); *B08B 3/10* (2013.01); *B08B 3/108* (2013.01); *C02F 1/66* (2013.01); *B08B 2203/007* (2013.01); *C02F 1/008* (2013.01); *C02F 1/505* (2013.01); *C02F 1/76* (2013.01);
(Continued)

(58) Field of Classification Search
None
See application file for complete search history.

(56) References Cited

U.S. PATENT DOCUMENTS 4,877,351 A * 10/1989 Enami ...................... E02C 1/06
  405/86
5,013,184 A * 5/1991 Omachi ................... E02C 1/00
  405/85
5,295,762 A 3/1994 Lopez et al.

FOREIGN PATENT DOCUMENTS

WO WO 2012/001027 * 1/2012

OTHER PUBLICATIONS

Steffen Woudstra. Design and feasibility study for the application of an inflatable rubber structure in a navigation lock. Nov. 24, 2014. https://repository.tudelft.nl/islandora/object/uuid:d2f5ffd1-75cf-4af7-8cd7-62edd88baa5e/datastream/OBJ/download.

* cited by examiner

*Primary Examiner* — Donald R Spamer
(74) *Attorney, Agent, or Firm* — James Mitchell; Jill Welytok

(57) ABSTRACT

The invention is an immersion system for decontamination of ship outer surfaces while a ship is located in a lock structure. The lock structure is modified with an inflatable bladder and shortened containment gates. When the ship enters or exits the lock structure, the inflatable bladder is deflated before opening the containment gates. When the inflatable bladder is deflated, a lower treated fluid layer sinks and water adjacent to the lock structure enters the lock through wall ports to create an upper fluid layer on which the ship enters. When the ship is located in the lock structure and the containment gates are closed, the inflatable bladder is inflated. When the inflatable bladder is inflated, the lower treated fluid layer rises and surrounds the ship surface to kill invasive aquatic species.

26 Claims, 3 Drawing Sheets

(51) Int. Cl.
   *C02F 1/66*   (2006.01)
   *B08B 3/08*   (2006.01)
   *B08B 3/10*   (2006.01)
   *C02F 1/00*   (2006.01)
   *E02C 1/06*   (2006.01)
   *C02F 103/00*   (2006.01)
   *C02F 1/76*   (2006.01)
   *C02F 1/50*   (2006.01)

(52) U.S. Cl.
   CPC .... *C02F 2103/008* (2013.01); *C02F 2209/01* (2013.01); *C02F 2209/02* (2013.01); *C02F 2209/05* (2013.01); *C02F 2209/06* (2013.01); *C02F 2209/245* (2013.01); *C02F 2303/04* (2013.01); *E02C 1/06* (2013.01)

HYDROXIDE STABILIZATION AS A MEANS OF CONTROLLING SURFACE FOULING ASSOCIATED WITH WETTED SURFACES OF BOATS BARGES AND SHIPS

CROSS-REFERENCE TO RELATED APPLICATIONS

This patent application claims the benefit of U.S. Provisional Application No. 62/599,987 filed Dec. 18, 2017. The above application is incorporated by reference.

FIELD OF INVENTION

This invention relates to the field of treating hull fouling of ships and more specifically to conserving treated water.

BACKGROUND OF THE INVENTION

Numerous prohibited invasive species have been introduced to the Great Lakes by cargo ship surfaces to which these organisms have attached, and by the discharge of contaminated cargo ship ballast water.

The zebra mussel (*Dreissena polymorpha*) is an example of a prohibited invasive species, which means it is unlawful (a misdemeanor) to possess, import, purchase, transport, or introduce this species except under a permit for disposal, control, research, or education.

Once introduced, some prohibited invasive species damage power plants, cities and residences when they clog water intakes. Prohibited invasive species also disrupt local ecosystems and kill native species. Removal of prohibited invasive species requires costly equipment and eradication measures.

Some of these species can survive on ship surfaces for several weeks. Wetted surfaces of the ship, including the hull, sea chest and ballast piping systems often introduce invasive species including adult bivalves and barnacles. Surface fouling by prohibited invasive species is linked to elevated ship fuel consumption rates.

Thirty six percent of invasive marine species prevalent in North America are thought to be the result of ship surface fouling. In Hawaiian waters, some 90% of the 343 invasive marine species present are thought to have been introduced through this mechanism.

Surface coatings to prevent surface fouling are known in the art. However, many effective coatings are being prohibited due to their toxic effects.

It is impractical to dry dock vessels to treat surface fouling.

There is an unmet need for methods and systems which can address surface fouling of commercial vessels without removing the vessels from the water.

It is known in the art that invasive species may be killed by exposure to a solution with pH, salinity, $CO_2$ concentrations, or other levels that are above or below the ranges at which aquatic invasive species can survive. The majority of aquatic species can only survive in environments with pH levels between approximately 6 and 9.

Aquatic species are extremely sensitive to changes in the pH level, and this sensitivity may be heightened by adjusting other chemical attributes that cause further stress to microorganisms, including temperature, salinity, $CO_2$ concentration, and atmospheric pressure.

The pH level of water in ballast tanks is commonly adjusted to create an environment that is lethal to aquatic organisms. One way to adjust the pH level is to add a basic or acidic substance to the water. Basic substances have high pH levels and can increase the pH level of the water. Examples of basic substances known in the art include hydrated lime, sodium hydroxide, and potassium hydroxide. Acidic substances have low pH levels and can decrease the pH level of the water.

Another way to lower the pH level is to add $CO_2$ to the water. The $CO_2$ reacts with water to form carbonic acid ($H_2CO_3$); hence acid is being added to seawater, thereby acidifying it. Pressure and temperature are also known to affect the pH level and the amount of CO2 required to eliminate invasive species. Accordingly, U.S. Pat. No. 6,821,442, entitled Method and Apparatus for Control of Aquatic Vertebrate and Invertebrate Invasive Species teaches the use of pressure and dissolved $CO_2$ to safely neutralize microorganisms, plankton, and larvae in ballast water.

It is a problem known in the art that large surface areas of ships and volumes of water within ballast tanks require substantial quantities of treatment solution. Additives used to make treatment solutions must be thoroughly mixed to ensure uniform distribution, to minimize the required amount of additives for effective treatment, and to avoid distortions in measurement that can lead to harmful overuse of additives. The proper mixing of treatment solution is costly in terms of energy used, and ships incur substantial down-time during treatment processes which must be minimized.

Accordingly, U.S. Pat. No. 9,688,551, entitled Nozzle Mixing Apparatus and Methods for Treating Water in Ship Ballast Tanks, teaches the use of mixing methods to reduce the amount of toxic chemicals and time required to effectively eradicate invasive species within ballast water.

It is a further problem known in the art that the treatment solution with adjusted pH levels used to kill invasive species must be carefully contained and neutralized before being released into the surrounding environment to avoid damage to non-invasive species in local ecosystems.

There is an unmet need for a system that can reduce costs associated with treating ship surfaces by reducing costly energy consumption and down-time associated with treatment for invasive species.

There is further need for systems which can control the spread of invasive species by treating ship surfaces and which can effectively neutralize treatment solution before discharge into the surrounding environment.

SUMMARY OF THE INVENTION

The invention is an immersion system for decontamination of ship outer surfaces while a ship is located in a lock structure. In various embodiments, the invention includes a lock structure, inflatable bladder, upper fluid layer, lower treated fluid layer, treated water reservoir, bladder fill reservoir, ship towing line, and wall ports.

In various embodiments, the lock structure includes containment gates to allow a ship to enter and exit the lock and an inflatable bladder. When the ship enters or exits the lock structure, the inflatable bladder is deflated before opening the containment gates.

When the inflatable bladder is deflated, the lower treated water layer with increased pH and specific gravity sinks below the level of the containment gate and water adjacent to the lock structure enters the lock through wall ports to create an upper fluid layer on which the ship enters.

When the ship is located in the lock structure and the containment gates are closed, the inflatable bladder is inflated.

When the inflatable bladder is inflated, the upper fluid layer exits the lock structure through wall ports and the lower treated water layer rises and contacts the ship surface. The increased pH of the lower treated water layer kills invasive aquatic species on the ship surface.

In various embodiments, the invention includes a ship towing line for moving the ship while its engines are off to mitigate turbulence.

TERMS OF ART

As used herein, the term "additive" means a chemical substance added to ballast water to increase or decrease the pH level. Additives may be classified as a base, an acid, or $CO_2$.

As used herein, the term "base additive" or "base solution" means a chemical substance used to raise the pH level of ballast water, including but not limited to hydrated lime, sodium hydroxide, and potassium hydroxide.

As used herein, the term "effective pH level" means a pH level within a range that is lethal or effective to eradicate aquatic organisms in a ballast tank, taking into account all relevant environmental conditions including temperature, pressure, and salinity. An effective pH level is either above or below the range at which microorganisms can survive.

As used herein, the term "effective quantity" means a quantity of an additive that produces an effective pH level when added to ballast water.

DETAILED DESCRIPTION OF THE INVENTION

Figure 1:
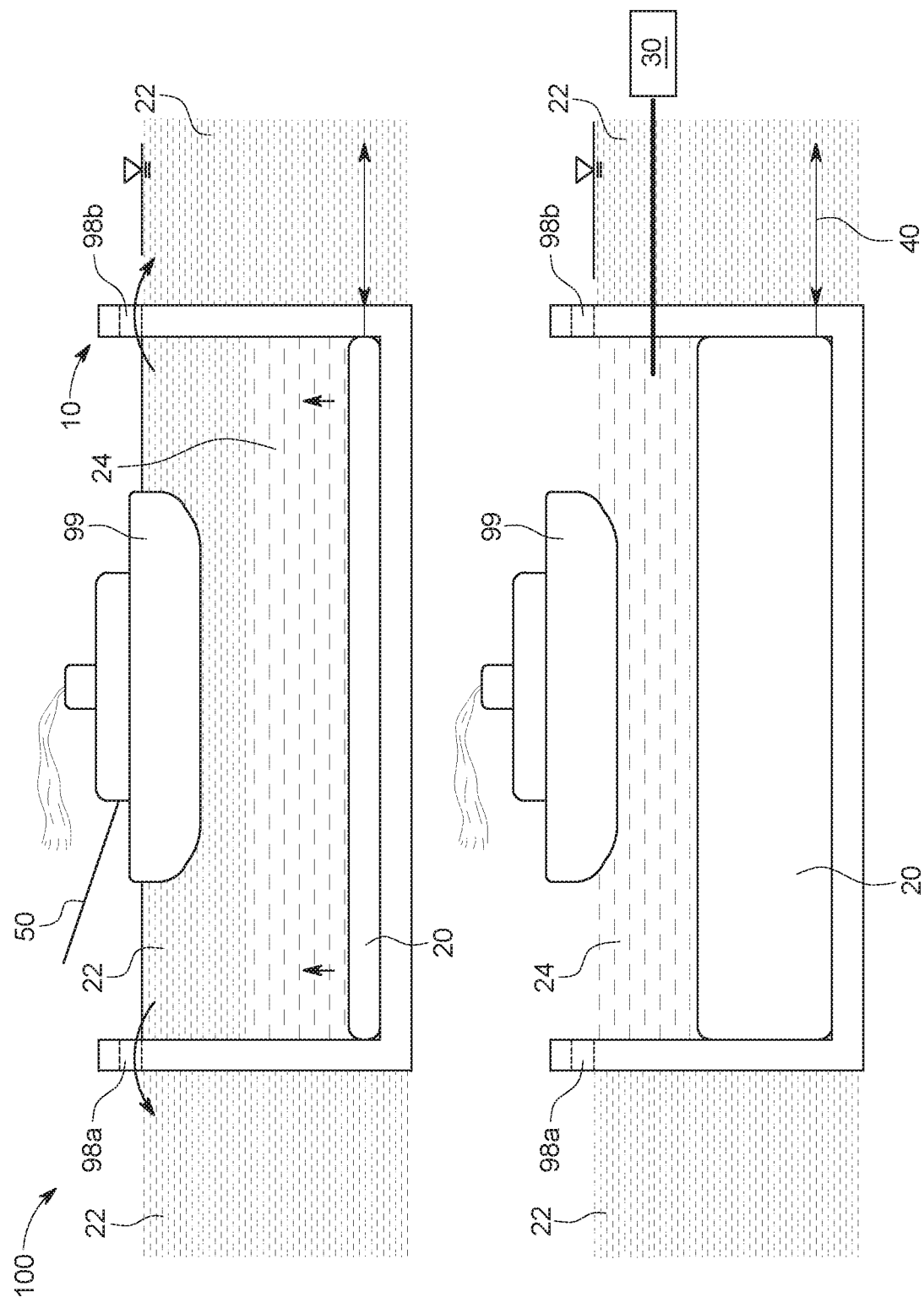
FIG. 1 illustrates one embodiment of an immersion system for surface decontamination of ships.

FIG. 1 illustrates one embodiment of immersion system 100 for surface decontamination of ships. Decontaminating the outer surface of a ship protects ecosystems from invasive species transported by ships.

Visible in FIG. 1 are lock structure 10, inflatable bladder 20, upper fluid layer 22, lower fluid layer 24, treated water reservoir 30, line to bladder fill reservoir 40, ship towing line 50, wall ports 98a and 98b and ship 99.

Lock structure 10 has containment gates to allow a ship to enter and exit the lock. When ship 99 enters or exits lock structure 10, inflatable bladder 20 is deflated before opening the containment gates.

Lower fluid layer 24 is comprised of treated water with a chemical composition that kills invasive species and a specific gravity that is higher than the specific gravity of the water outside of lock structure 10. In various embodiments, the chemical composition that kills invasive species is a high salinity, high pH level, high carbonation level ($CO_2$ concentration), high temperature, high biocide content, and/or high algaecide content. When inflatable bladder 20 is deflated, lower fluid layer 24 sinks below the level of the containment gates and local water adjacent to lock structure 10 enters through wall ports 98a and 98b to create upper fluid layer 22.

Ship 99 will float into lock structure 10 on upper fluid layer 22. In various embodiments, wall ports 98a and 98b may be any shape known in the art. In still other embodiments, Weir type ports may be used.

When ship 99 is located in lock structure 10 and containment gates are closed, inflatable bladder 20 is inflated. When inflatable bladder 20 is inflated, lower fluid layer 24 rises to contact the outer surface of ship 99 and upper fluid layer 22 exits lock structure 10 through wall ports 98a and 98b. The outer surface of ship 99 includes the hull, the sea chest, and other surfaces of the ship.

In the exemplary embodiment shown, treated water reservoir 30 contains treated water or a component of the treated water and is operatively coupled with a pumping system and flow meter or other means to move the treated water into lock structure 10 to create lower fluid layer 24. In various embodiments, treated water reservoir 30 and lock structure 10 are operatively coupled with a pH meter, salinity meter, thermometer, conductivity meter, and other meters or sensors to monitor and adjust the pH level, salinity, temperature, $CO_2$ content, biocide content, and specific gravity of the treated water. In various embodiments, the treated water has a high salinity to increase its specific gravity. In various embodiments, the treated water contains liquid sodium hydroxide, potassium hydroxide, hydrated lime or another base additive to increase its pH level to an effective pH level of approximately 10 to 12. This pH level is fatal for aquatic organisms. In various embodiments, the temperature, pressure, and salinity of the water may affect how much base additive is required to achieve the effective pH level.

In various embodiments, to discard treated water having a high pH level, the water may be treated with $CO_2$ to reduce the pH to levels that can support life before releasing the treated water into the environment.

In still other embodiments, the high salinity and/or temperature of lower fluid layer 24 can kill invasive species without adjusting the pH level. In various embodiments, salinity levels of approximately 35 parts per thousand kill freshwater organisms. In various embodiments, the temperature of lower fluid layer 24 may be increased by absorbing solar heat or by a heating component.

In the exemplary embodiment shown, line to bladder fill reservoir 40 operatively couples with an isolated reservoir of treated water, inflatable bladder 20, and a pumping system and flow meter or other means such as gravity flow to move the water into and out of inflatable bladder 20 to inflate and deflate bladder 20. This water has a specific gravity that is higher than lower fluid layer 24 to ensure that inflatable bladder 20 does not rise above lower fluid layer 24. In various embodiments, the increased specific gravity may be due to increased salinity. In various embodiments, line to bladder fill reservoir 40 is operatively coupled with a salinity meter to monitor the salinity of the high specific gravity water.

Inflatable bladder 20 has dimensions that are approximately equal to the floor of lock structure 10 and may be comprised of multiple inflatable bladders that may be operatively coupled, to increase the ease of manufacturing the bladder. The closure mechanism required by the bladder may consist of small inflatable diaphragms or pillows that are filled for expansion and drained for contraction when needed using a control system based on time, or manual input, that includes a control valve or valves for the required flow control of the selected fluid. Knife valves either operated independently or linked mechanically provide an alternative closure mechanism. In various embodiments, these valves are operatively coupled with line to bladder reservoir 40.

In the exemplary embodiment shown, system 100 reuses a volume of treated water for multiple ships to minimize the required volume of treated water. System 100 utilizes a salinity gradient to prevent mixing of the treated water (high specific gravity, high pH) water in lower fluid layer 24 with untreated local waters in upper fluid layer 22.

In various embodiments, discharge from the wall ports 98a and 98b can be collected in a plug-flow manifold line (not shown) so as to minimize treated water loss during expansion and contraction of inflatable bladder 20. In various embodiments, the water collected in the plug-flow manifold line may be drawn from a reservoir containing low-salinity water that may be treated so as to eliminate dissolved $CO_2$.

In the exemplary embodiment shown, ship towing line 50 is a means for moving ship 99 into and out of lock structure 10 without creating turbulence to avoid mixing between lower fluid layer 24 and upper fluid layer 22. Movement of the treated vessel into and out of lock structure 10 would preferably be achieved without use of the boat, barge or ship propulsion system so as to minimize disturbance of the salt water gradient through propeller wash. In various embodiments, ship towing line 50 is comprised of cable, ropes, hydraulic cylinders or other motorized tow mechanisms for positioning a ship while its power is shut off.

In various embodiments, ship 99 is more buoyant when in contact with lower fluid layer 24 and lower fluid layer 24 cannot contact all of the surface area that would normally be submerged. In these embodiments, system 100 includes jets to spray lower fluid layer 24 onto these exposed surfaces. Alternatively, ship 99 could take on additional ballast to maintain a target draft condition in lower fluid layer 24.

In various embodiments, lower fluid layer 24 may contain alternative biocides like those described for algae (algaecides) including copper sulfate, or other oxidizing biocides including chlorine.

A shallow layer or boundary exists between upper fluid layer 22 and lower fluid layer 24 and is called the main gradient or non-convective zone. Minimizing the thickness of this zone achieves a clear or complete displacement of the local water in upper fluid layer 22 with inflation of bladder 20. This requires the control of fluid mixing forces that may be related to ship movement or diaphragm inflation or deflation.

In various embodiments, target salinity levels will be related to site specific conditions that influence salinity gradient stability. Pumping power requirements for the bladder will be related to the difference between the salinity in the overlying layer and the underlying layer and the water used to fill the diaphragm. Preferably, pumps adding or removing water from the bladder will be coupled to isolated line to bladder fill reservoir 40 or a second bladder that eliminates communication of the elevated salinity fill water with the water or land of the surrounding environment.

Figure 2:
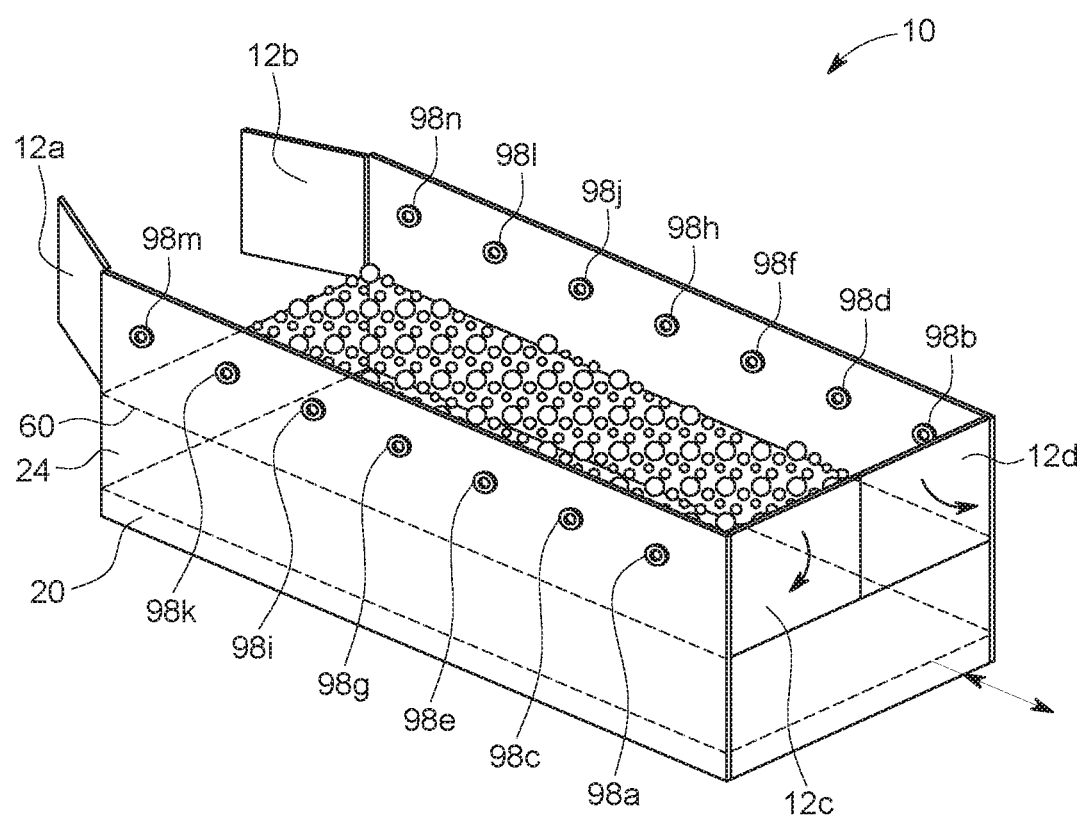
FIG. 2 is an isometric view of a specially configured lock structure for use with an immersion system for surface decontamination of ships with an open gate, a barrier layer, and wall ports.

FIG. 2 is an isometric view of a specially configured lock structure for use with an immersion system for surface decontamination of ships with an open gate, a barrier layer, and wall ports.

Visible in FIG. 2 are containment gates 12a through 12d, barrier layer 60, and wall ports 98a through 98n.

In the exemplary embodiment shown, gates 12a and 12b are open to allow the entry or exit of a ship. Additionally, inflatable bladder 20 is deflated so lower fluid layer 24 sinks below containment gates 12a through 12d.

Containment gates 12a through 12d do not extend below lower fluid layer 24 with bladder 20 in the deflated condition. Containment gates 12a through 12d are liquid tight and move through use of mechanical linkages not shown.

In alternative embodiments, another method for controlling mixing forces is to allow for movement of water into and out of the lock structure 10 through a large number of wall ports 98a through 98n with valves that are specifically placed to keep local velocities low and inlet or outlet flows spread evenly along both sides of the containment vessel.

In various embodiments, System 100 may include barrier layer 60, with a buoyancy greater than lower fluid layer 24 but less than upper fluid layer 22. In various embodiments, barrier layer 60 is a layer of buoyant plastic beads, which simulate a membrane that prevents interchange and diffusion between lower fluid layer 24 and upper fluid layer 22 to conserve the treated water in lower fluid layer 24. Barrier layer 60 is made of beads or another material with a specific gravity that prevents bead movement into the lower convective zone due to buoyant forces but also keeps the beads from rising above the main gradient zone. The beads would have a specific gravity that is less than the high pH salt water in lower fluid layer 24 but greater than the overlying upper fluid layer 22 of local water in the upper convective zone.

In various embodiments, barrier layer 60 is comprised of ABS plastic beads (resin) that have a specific gravity that is 1.04. Hence it would sink in a local freshwater to the boundary of the lower convective zone but would not penetrate the zone. Cross-linked poly acrylamide is an alternative resin type. Here the resin would be saturated initially with fresh water providing again a specific gravity below the hypersaline water but higher than that of the upper convective zone. The presence of the beads would act to retard diffusion of reactants from regions of high concentration to regions of low concentration and would also act to dissipate energy related to hydraulic mixing forces.

Figure 3:
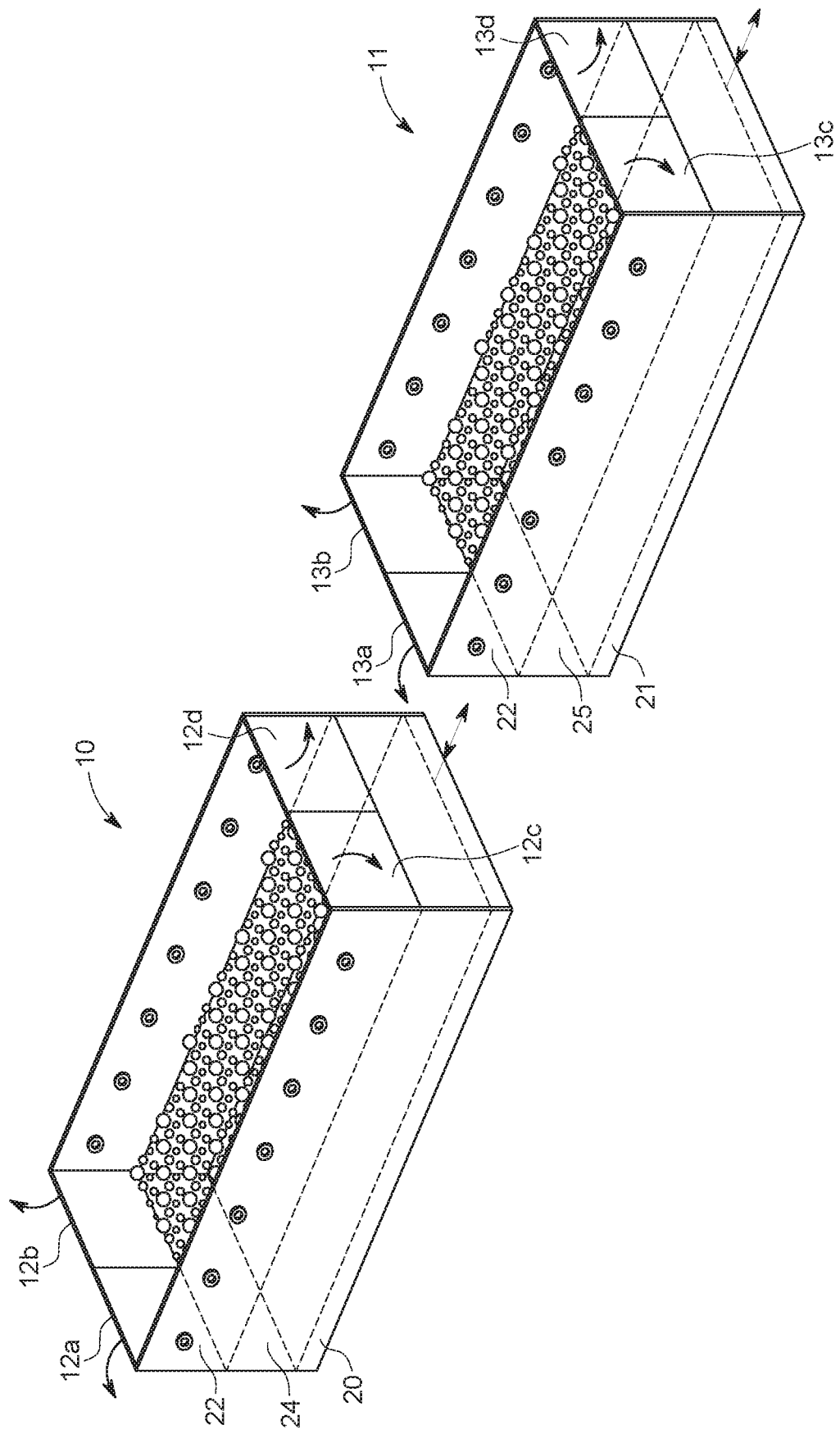
FIG. 3 illustrates one embodiment of an immersion system for surface decontamination of ships with an additional pretreatment lock structure.

FIG. 3 illustrates one embodiment of an immersion system for surface decontamination of ships with additional pretreatment lock structure 11.

Visible in FIG. 3 are lock structure 10, pretreatment lock structure 11, pretreatment containment gates 13a through 13d, pretreatment inflatable bladder 21, and pretreatment lower fluid layer 25.

In the exemplary embodiment shown, pretreatment lower fluid layer 25 is comprised of water with increased specific gravity and $CO_2$ injected in it to increase its carbonation level. After pretreatment lower fluid layer 25 contacts the outer surface of a ship, the ship requires less time in contact with the high pH lower fluid layer 24 to kill invasive species on the outer surface of the ship. In various embodiments, the elevated salinity and carbonation level of pretreatment lower fluid layer 25 kills invasive species and eliminates the need for moving the ship into lock structure 10.

In the exemplary embodiment shown, the $CO_2$ in pretreatment lower fluid layer 25 acts as a narcotizing agent rendering target species more susceptible to the toxic effects of the elevated pH, salinity, and/or temperature in treated water in lower fluid layer 24 to kill target species. The gas ($CO_2$) is used to prevent isolation of target bivalves from the altered environment during treatment.

Pretreatment lock structure 11 holds $CO_2$/salinity adjusted water in pretreatment lower fluid layer 25 and is located upstream of lock structure 10 with the elevated pH treatment system. Pretreatment lock structure 11 would receive the ship to be treated by allowing it to float into the lock on an overlying layer of relatively low specific weight local water. Once containment gates 13a through 13d are closed, submerged bladder 21 is inflated with local water or preferably water with a specific gravity equal to or greater than that in the elevated pH/salinity/temperature water through low head pumping. The latter will eliminate the potential for the bladder to "float". Following treatment with an appropriate exposure period, the bladders are deflated, by pumping or gravity flow, the salt water in the container or lock then drops to its original position and fresh or low salinity water re-enters the pretreatment lock structure 11 (with little or no mixing) allowing the ship to exit pretreatment lock structure 11. Afterward, the ship would be moved into the lock structure 10 for exposure to the elevated pH/salinity/temperature water in lower fluid layer 24.

In the exemplary embodiment shown, the carbonators would be designed so as to carbonate the water without disturbing the halocline. This could be achieved by operating the carbonators on a side stream (outside of the container) with reintroduction of the recirculated, carbonated water through submerged manifolds operating at low pressure drops across the orifices involved. In various embodiments, carbonation of the salt water by injecting $CO_2$ can be achieved by a number of different means including packed towers and Speece Cones, u-tubes, ventures, static water mixers and gas sparging operations. Use of engine exhaust high in $CO_2$ and low in oxygen could help to reduce operating costs when the engine exhaust is recovered from those engines used to power pumps moving water into and out of the bladder system.

In various embodiments, the communication of waters between pretreatment lower fluid layer 25 charged with dissolved $CO_2$ and lower fluid layer 24 charged with NaOH or hydrated lime should be eliminated or minimized so as to avoid the reaction of $CO_2$ with the NaOH or hydrated lime.

In various embodiments, additional steps may be required after treatment. After a large ship is cleaned and the surface material is released in lock structure 10, this material may have to be removed from lock structure 10 and the pH level of lower fluid layer 24 will need to be maintained. Various filtration or separation methods known in the art can be efficiently used to remove this material.

What is claimed is:

1. A system for decontaminating the outer surface of a ship positioned in a lock structure,
   comprised of:
   a lock structure having a floor and walls;
   a volume of water comprised of:
   an upper stratum of untreated water; and
   a lower stratum of treated water;
   and an inflatable bladder structure.

2. The system of claim 1, wherein said upper stratum is comprised of untreated water having a chemical composition substantially equivalent to the water adjacent to the lock structure,
   wherein said chemical composition includes
   a salinity level, a specific gravity, a pH level, a temperature, and a CO2 concentration.

3. The system of claim 1, wherein said lower stratum is comprised of treated water having chemical attributes which include a salinity level, a specific gravity, a pH level, a temperature, and a CO2 concentration.

4. The system of claim 1, wherein said inflatable bladder structure is filled with a fluid which has a higher specific gravity than said lower stratum.

5. The system of claim 1, wherein said lock structure walls, which allow the exit and entry of untreated water in said upper stratum from and into said lock structure.

6. The system of claim 5, wherein said walls include structural components selected from a group consisting of wall ports, slots, apertures, ducts, and valves.

7. The system of claim 1, which further includes a reservoir and a pump assembly, wherein said reservoir contains treated water having at least one elevated chemical attribute selected from a group consisting of pH level, salinity level, CO2 concentration, temperature, and specific gravity level, wherein said treated water will form said lower stratum.

8. The system of claim 7, which further includes at least one meter component for monitoring and adjusting the pH level of said treated water.

9. The system of claim 7, which further includes at least one meter component for monitoring and adjusting the salinity level of said treated water.

10. The system of claim 7, which further includes at least one meter component for monitoring and adjusting the temperature of said treated water.

11. The system of claim 7, which further includes at least one meter component for monitoring and adjusting the specific gravity of said treated water.

12. The system of claim 7, which further includes at least one meter component for monitoring and adjusting said CO2 concentration.

13. The system of claim 7, which further includes meter components for contemporaneously monitoring and adjusting at least two of said chemical attributes of said treated water to maintain said pH level and said salinity level within ranges that kill aquatic organisms.

14. The system of claim 1, which further includes a barrier stratum comprised of buoyant material located between said upper stratum and said lower stratum, wherein said barrier stratum prevents interchange and diffusion to conserve said lower stratum.

15. The system of claim 14, wherein said buoyant material has a density greater than the density of said upper stratum and less than the density of said lower stratum.

16. The system of claim 1, which further includes a second lock structure having a second inflatable bladder structure, a second upper stratum, and a second lower stratum, wherein said second lower stratum has an adjusted and elevated CO2 concentration.

17. The system of claim 1, which further includes an effective quantity of hydrated lime,
   sodium hydroxide or potassium hydroxide to raise the pH level of said treated water to an effective pH level.

18. The system of claim 1, wherein said bladder structure is under said lower stratum.

19. The system of claim 1, which further includes an effective quantity of base additive to raise the pH level of said treated water to an effective pH level.

20. A method for decontaminating the outer surface of a ship contained within a lock structure, comprised of the steps of:
   forming an upper stratum of untreated water having a chemical composition substantially equivalent to the water adjacent to the lock structure, wherein said chemical composition includes a salinity level, a specific gravity, a pH level, a temperature, and a CO2 concentration; the lock structure having a floor and walls;
   forming a lower stratum of treated water within the lock structure having a chemical composition that is lethal to aquatic organisms and a specific gravity that is higher than the specific gravity of said upper stratum; and displacing said upper stratum by inflating an inflatable bladder structure.

21. The method of claim 20, which further includes the step of filling said inflatable bladder structure with a fluid which has a higher specific gravity than said lower stratum.

22. The method of claim 20, which further includes the step of monitoring and adjusting said pH level, salinity level, $CO_2$ concentration, and temperature to maintain a chemical composition in said treated water that is lethal to aquatic organisms.

23. The method of claim 20, which further includes the step of adding a base additive to said treated water to increase said pH level selected from the group consisting of sodium hydroxide, potassium hydroxide, and hydrated lime.

24. The method of claim 20, which further includes the step of monitoring and adjusting the salinity level of said treated water to increase the specific gravity of said treated water.

25. The method of claim 20, which further includes the step of adding $CO_2$ to a quantity of said treated water to lower the pH level of said treated water prior to discharge from said lock structure after a process to eradicate microorganisms.

26. The method of claim 20 further including prior to inflating said inflatable bladder structure,
said bladder is placed under said treated water.

* * * * *